United States Patent
Harris et al.

[11] Patent Number: 6,012,606
[45] Date of Patent: Jan. 11, 2000

[54] APPARATUS FOR DETECTING LOW LIQUID LEVEL IN BOTTOM-DRAINING CONTAINER

[75] Inventors: Clark Eugene Harris, Fairport; Dennis Robert Stell, Rochester, both of N.Y.

[73] Assignee: Eastman Kodak Company, Rochester, N.Y.

[21] Appl. No.: 08/671,459

[22] Filed: Jun. 27, 1996

[51] Int. Cl.⁷ .................................................. G03D 3/06
[52] U.S. Cl. ............................... 222/51; 222/67; 141/96; 141/351; 340/619; 340/624; 396/578; 396/626
[58] Field of Search .................. 222/51, 64, 67; 141/95, 96, 198, 348–350, 364, 351–354; 137/397, 398; 340/619, 623, 624; 396/578, 626

[56] References Cited

U.S. PATENT DOCUMENTS

| | | | |
|---|---|---|---|
| 1,366,862 | 1/1921 | Berry | 222/51 |
| 1,393,272 | 10/1921 | Dutton et al. | 222/51 |
| 1,945,725 | 2/1934 | Bonney | 222/51 |
| 2,076,454 | 4/1937 | Foxwell | 340/623 |
| 2,409,245 | 10/1946 | Black | 222/51 |
| 4,014,010 | 3/1977 | Jinotti | 340/619 |
| 4,574,849 | 3/1986 | Fukuda | 141/95 |
| 4,714,176 | 12/1987 | Wijnen | 222/51 |
| 5,031,676 | 7/1991 | Ulm | 141/349 |
| 5,467,806 | 11/1995 | Stricklin et al. | 141/346 |
| 5,501,255 | 3/1996 | Tortu et al. | 141/95 |
| 5,585,786 | 12/1996 | Clark et al. | 340/623 |
| 5,596,351 | 1/1997 | Stapleton | 340/619 |
| 5,694,991 | 12/1997 | Harris et al. | 141/346 |
| 5,781,821 | 7/1998 | Nakashima et al. | 396/626 |

FOREIGN PATENT DOCUMENTS

| | | | |
|---|---|---|---|
| 0 675 072 A1 | 3/1994 | European Pat. Off. | |
| 2-128122 | 5/1990 | Japan | 340/619 |
| 600450 | 4/1948 | United Kingdom | 340/619 |

*Primary Examiner*—J. Casimer Jacyna
*Attorney, Agent, or Firm*—Gordon M. Stewart; Frank Pincelli; David A. Novais

[57] ABSTRACT

An apparatus for is disclosed for detecting low liquid level in a bottom-draining container (12), the apparatus including a spout (14, 48) extended outwardly from the container, the spout having a central bore (18) through which liquid can drain from a bottom of the container; at least one guide member (26, 56, 62) positioned in the spout; at least one float (38) mounted for movement in the spout along the guide member, the float being buoyant in a liquid to be drained from the container; a source (42) for directing a beam of radiation into the spout along a path intersected by the float when a liquid drains to a preselected level within the spout; and a device (44, 46) for detecting when the float intersects the beam. The guide member may be omitted in one embodiment.

21 Claims, 1 Drawing Sheet

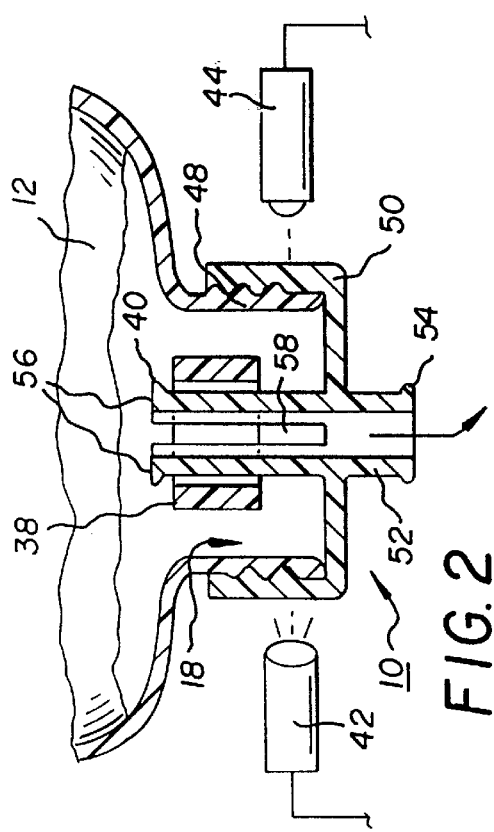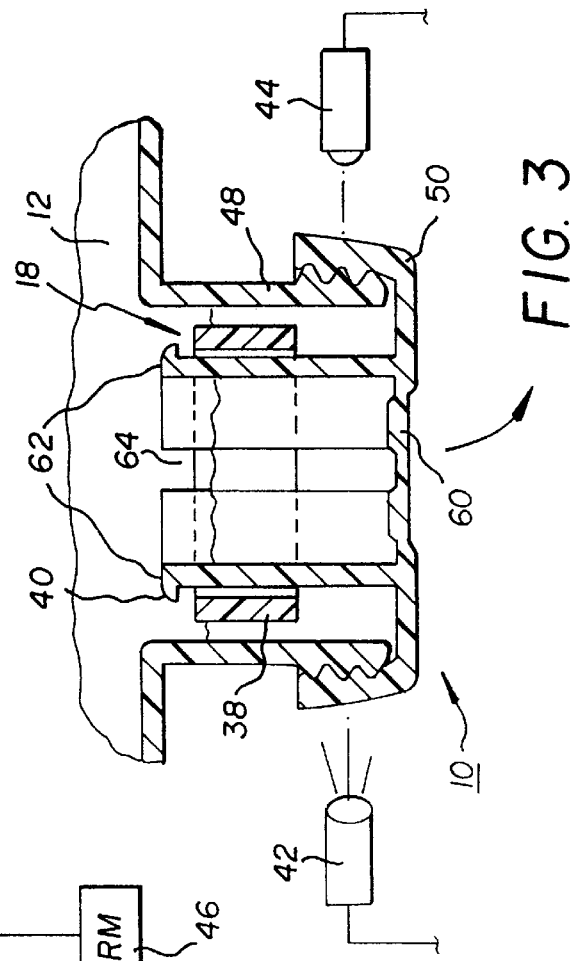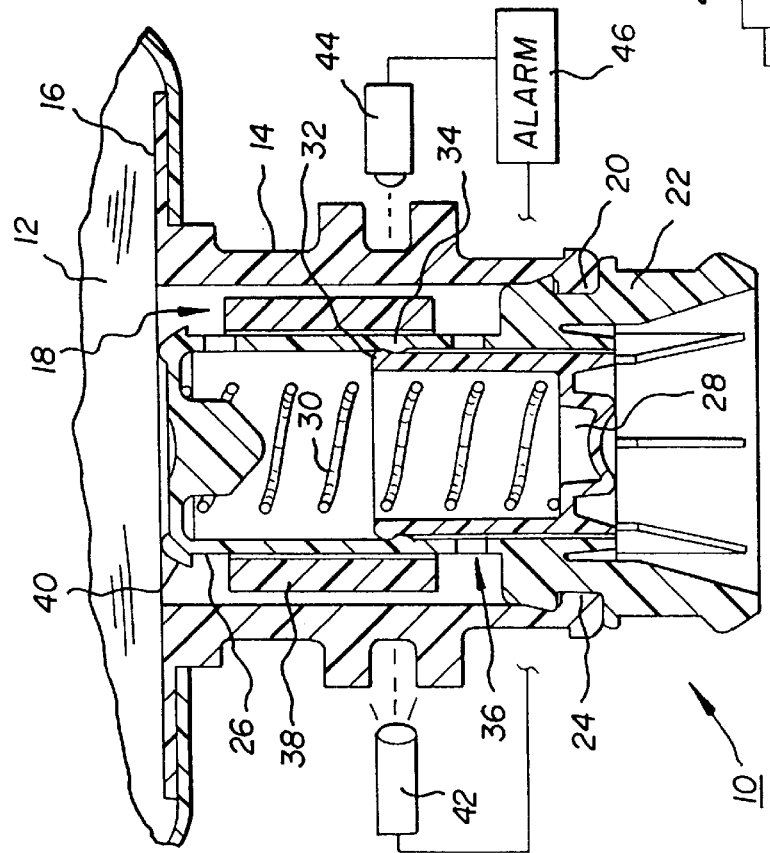

APPARATUS FOR DETECTING LOW LIQUID LEVEL IN BOTTOM-DRAINING CONTAINER

TECHNICAL FIELD

The invention relates to containers for dispensing liquids. More particularly, the invention concerns containers which drain through a bottom opening and techniques for detecting a low liquid level in such containers.

BACKGROUND OF THE INVENTION

Commonly assigned, published European Patent Application No. 0 675 072 A1 discloses a valve assemblage useful for dispensing liquids from a collapsible container or a rigid, vented container. At the bottom of the container, a first valve is installed in a spout of the container, the first valve including a moveable, spring-biased piston which normally prevents flow of liquid from the container. An associated apparatus, such as a photographic processor into which the liquid is to be dispensed, includes a second valve having a probe member which engages the piston of the first valve to move the piston to a position which permits flow. As the first valve is opened by the probe, the second valve also opens, thus establishing a flow path for liquid from the container into the associated apparatus.

As the associated apparatus operates, the liquid drains from the container. It would be desirable to provide a simple means for detecting and signaling a low liquid level within the container, to enable an operator of the associated apparatus to replace the container in a timely fashion. Various systems are known for detecting liquid level in a vessel, such as those shown in U.S. Pat. Nos. 4,014,010 and 4,714,176. However such systems either require expensive and complex modifications to the vessel to incorporate the detection system, or measure liquid level outside the vessel under circumstances where the vessel may actually have emptied before low level is detected. In the latter case, air may be drawn into the associated apparatus, which could cause operating difficulties.

SUMMARY OF THE INVENTION

The primary objective of the invention is to provide an improved apparatus for detecting low liquid level in a bottom-draining container.

A further objective is to provide such an apparatus which can be used with existing container styles without requiring modification of the container.

Another objective is to provide such an apparatus which can be used with an associated apparatus which uses liquid from the container, without requiring substantial modifications of the associated apparatus.

Yet another objective is to provide such an apparatus which can detect low liquid level in time to prevent air from entering an associated apparatus from the container.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

An apparatus in accordance with the invention is useful for detecting low liquid level in a bottom-draining container. As such, the apparatus may include a spout extended outwardly from the container, the spout having a central bore through which liquid can drain from a bottom of the container; at least one guide member positioned in the spout; at least one float mounted for movement in the spout along the guide member, the float being buoyant in a liquid to be drained from the container; means for directing a beam of radiation into the spout along a path intersected by the float when a liquid drains to a preselected level within the spout; and means for detecting when the float intersects the beam. The guide member may be omitted in one embodiment.

The apparatus may include a closure member for the spout, the guide member being supported by the closure member; and means supported by the closure member for allowing liquid to be drained from the container. The means for allowing liquid to be drained may include a valve supported by the closure member, the valve including a body member constituting the guide member. When the valve body is cylindrical, the float may be annular and may extend around the valve body, the valve body having radial stop means for limiting upward movement of the float. The spout and valve may be translucent to and the float may be opaque to the beam of radiation. Alternatively, the spout may be translucent to and the float may be reflective of the beam of radiation.

In another embodiment, the means for allowing liquid to be drained may include a drain conduit supported by the closure member, the guide member being positioned within the spout adjacent the drain conduit. There may be a plurality of guide members arranged around an entrance to the drain conduit, the float may be annular and may extend around the plurality of guide members, and the guide members may include radial stop means for limiting upward movement of the float.

In yet another embodiment, the means for allowing liquid to be drained may include a frangible portion or a pierceable septum portion of the closure member, the guide member being positioned within the spout adjacent the frangible or septum portion. There may be a plurality of guide members arranged around the frangible or septum portion, the float may be annular and may extend around the plurality of guide members, and the guide members may include radial stop means for limiting upward movement of the float.

A closure in accordance with the invention is useful for a bottom-draining container. The closure may include a first body member; means associated with the first body member for attaching the closure to an associated container; a guide member supported by the first body member so that the guide member will extend upward into an associated container when the closure is attached; means supported by the first body member for allowing liquid to be drained from an associated container; and at least one float mounted for movement along the guide member, the float being buoyant in a liquid to be drained from an associated container. The means for allowing liquid to be drained may include a valve supported by the first body member, a drain conduit, a frangible portion, or a pierceable septum portion of the types described in the preceding paragraphs.

A bottom-draining container in accordance with the invention may include a spout extended outwardly from the container, the spout having a central bore through which liquid can drain from a bottom of the container; at least one guide member positioned in the spout; and at least one float mounted for movement in the spout along the guide member, the float being buoyant in a liquid to be drained from the container. The container also may include a closure member for the spout, the guide member being supported by the closure member; and means supported by the closure member for allowing liquid to be drained from the container. The means for allowing liquid to be drained may include a valve supported by the first body member, a drain conduit, a frangible portion, or a pierceable septum portion of the types described in the preceding paragraphs. The guide member may be omitted in one embodiment.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 1 is an elevation, centerline section view of one embodiment of the apparatus, closure and container according to the invention, including a dispensing valve in the spout from the container.

FIG. 2 is an elevation, centerline section view of a second embodiment of the apparatus, closure and container according to the invention, including a drain conduit through the closure.

FIG. 3 is an elevation, centerline section view of a third embodiment of the apparatus, closure and container according to the invention, including a frangible portion or a pierceable portion in the closure.

DESCRIPTION OF THE PREFERRED EMBODIMENTS

The following is at detailed description of the preferred embodiments of the invention, reference being made to the drawings in which the same reference numerals identify the same elements of structure in each of the several Figures.

Referring to FIG. 1, those skilled in the art will understand a first embodiment of an apparatus 10 for detecting low liquid level in accordance with the invention. A container 12, shown only fragmentarily, may be collapsible or rigid and vented. In a suitable opening through a bottom of container 12, a spout member 14 is mounted to extend outwardly of the container. A flange 16 extends radially outwardly from the spout and is sealed to container 12 in any convenient way, such as by heat sealing. A central bore 18 extends through the spout to facilitate draining of liquid from the container. At a lower end of bore 18, a radially inwardly and circumferentially extended flange 20 engages a combined valve body and container closure 22. A circumferential groove in closure 22 tightly receives flange 20 to provide a seal. Extended upwardly from closure 22 is an integrally molded valve cylinder 26 within which a hollow valve piston 28 is mounted for sliding movement. A spring 30 is captured between cylinder 26 and piston 28 to bias the piston to the illustrated, closed position where a radially outwardly extended shoulder 32 on the piston engages a radially inwardly extended shoulder 34 on cylinder 26. A plurality of radial ports 36 extend through cylinder 26 near its lower end. In operation of the valve of FIG. 1, the container is lowered onto a probe in an associated apparatus. The probe engages piston 28 and causes it to move upwardly within cylinder 26 against the force of spring 30. Eventually, ports 36 are opened as the piston moves upwardly, thereby permitting flow of liquid downwardly from container 12 to the associated apparatus.

The invention provides means for detecting when the level of liquid reaches about the middle of spout 14. At least one annular float 38, made to be buoyant in the liquid flowing from the container, is mounted for sliding movement on an exterior surface of cylinder 26, which thus acts as a guide member for the float. A radially outwardly extended stop 40 is provided at or near an upper end of cylinder 26 to limit the upward movement of the float. Although a float which moves on a guide member has the advantage of capturing the float within the spout, the float also could comprise one or more spherical bodies placed in the container at the time of filling with liquid. In that instance, the float would simply roll and settle into the spout as the liquid level drops, making the guide member unnecessary. Or the float could be confined in the spout by any suitable means which would not interfere with flow of liquid from the spout.

Outside of spout 14, typically in the associated apparatus, a radiation source 42 is provided which produces a beam of radiation to which the materials of spout 14, cylinder 26 and piston 28 are translucent and to which the material of float 38 is opaque. The beam of radiation is directed across a chord, preferably a diameter, of spout 14; so that the float will intersect the beam as the float falls within the spout when the liquid has drained to that level. Opposite to source 42, a radiation detector 44 is provided. An alarm circuit 46, which may be comprised in a controller for the associated apparatus, is operatively connected to source 42 and detector 44. Those skilled in the art will appreciate that source 42 may be a conventional, combined emitter and detector, in which case float 38 would be reflective of the beam and separate detector 44 would be unnecessary, without departing from the scope of the invention. Because the liquid level is detected in spout 14, only a small percentage of the liquid originally in the container will remain when detector 44 is actuated. This is important since many governmental units have issued environmental regulations which require that less than about 3%, typically, of a potentially hazardous liquid remain in the container at the time of disposal.

When the liquid level is above spout 14, float 38 will rise to its maximum height, against stop 40. The beam from source 42 will pass through the translucent materials of spout 14, cylinder 26 and piston 28 to detector 44. As the liquid level drops into the spout, the float of opaque material will settle downward, eventually interrupting the beam of radiation and causing detector 44 and alarm circuit 46 to alert the operator of the associated equipment. For a source which produces light having wavelengths in the infrared spectrum, a suitable translucent material is low density polyethylene plastic; and a suitable opaque material is carbon-filled high density polyethylene plastic. Those skilled in the art will appreciate, however, that other materials and radiation spectrums may be selected without departing from the scope of our invention.

FIG. 2 shows a second embodiment of the invention. Container 12 includes an integral spout or neck 48 which accepts a screw-on closure 50 in the familiar manner. A central drain conduit 52 extends from closure 50 and includes a conventional hose fitting 54 for attachment to a delivery hose, not shown, in the associated apparatus. Extended upwardly from closure 50 around an entrance to conduit 52 are a plurality of guide members 56 which may be molded integrally with the closure. The guide members are separated by slots 58, only one of which is visible in the section view of FIG. 2. Float 38 is mounted around the guide members and its upward movement is limited by radial stops 40 at or near upper ends of the guide members. The second embodiment operates in the same manner as the first.

FIG. 3 shows a third embodiment of the invention. Rather than drain conduit 52, closure 50 includes a central frangible portion 60 which can be broken by a sharp probe or cannula in the associated apparatus, in the familiar manner. Rather than a frangible portion, a pierceable septum may be use.

Extended upwardly from closure 50 around portion 60 are a plurality of guide members 62 which may be molded integrally with the closure. The guide members are separated by slots 64, only one of which is visible in the section view of FIG. 3. The third embodiment operates in the same manner as the first and second.

The invention provides various advantages. The apparatus of FIGS. 1 to 3 will reliably and simply detect low liquid level in a bottom-draining container, without requiring expensive modifications to the container or the associated apparatus into which the liquid is to be dispensed. Because the detector senses liquid level in the spout of the container, only a tiny percentage of the liquid originally in the container will remain, an amount well below regulatory limits for disposal of containers for potentially hazardous materials. The closure of FIGS. 1 to 3 can be made and assembled with a float for later installation into a spout of a suitable container. Containers with closures embodying the guide members and float in accordance with the invention may be filled and shipped in the same manner as prior art containers.

| Parts List | | | |
|---|---|---|---|
| 10 | apparatus for detecting low liquid level | 36 | radial ports through 26 |
| | | 38 | annular float |
| 12 | container | 40 | radial stop on 26 |
| 14 | spout extended outwardly from 12 | 42 | radiation source |
| | | 44 | radiation detector |
| 16 | radial flange of 14 | 46 | alarm circuit |
| 18 | central bore of 14 | 48 | integral spout or neck |
| 20 | radiaily inward flange in 18 | 50 | screw-on closure |
| 22 | valve body and container closure | 52 | central drain conduit |
| 24 | circumferential groove in 22 | 54 | hose fitting |
| 26 | upwardly extended vaive cylinder | 56 | pluraiity of guide members |
| | | 58 | slot between 56 |
| 28 | hollow piston in 26 | 60 | central frangible portion or pierceable septum portion |
| 30 | spring | | |
| 32 | radialy outward shoulder on 28 | 62 | pluraiity of guide members |
| 34 | radialy inward shoulder in 26 | 64 | slot between 62 |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A photographic processing apparatus, comprising:
    (a) a bottom draining container having:
        a spout extended outwardly from the container, the spout having a central bore through which liquid can drain from the bottom of the container;
        at least one float located for movement in the spout, the float being buoyant in a liquid to be drained from the container; and
    (b) a photographic processor having:
        means on the processor, for communicating with the spout, to permit a flow of liquid downwardly from the container to the processor;
        means for directing a beam of radiation into the spout along a path intersected by a float in the spout when the liquid drains to a preselected level within the spout; and
        means for detecting when the float intersects the beam.

2. A photographic processing apparatus according to claim 1 wherein the float has a lower position in which an upper end of the float is within the spout.

3. A photographic processing apparatus according to claim 1 wherein the container additionally has at least one guide member positioned in the spout, and wherein the at least one float is mounted for movement in the spout along the guide member.

4. A photographic processing according to claim 3, further comprising:
    a closure member for the spout, the guide member being supported by the closure member; and
    means supported by the closure member for allowing liquid to be drained from the container.

5. A photographic processing according to claim 4, wherein the means for allowing liquid to be drained comprises a valve supported by the closure member, the valve including a body member constituting the guide member.

6. A photographic processing according to claim 5, wherein the spout and valve are translucent to- and the float is opaque to the beam of radiation.

7. A photographic processing according to claim 4, wherein the valve body is cylindrical, the float is insular and extends around the valve body, and the valve body comprises radial stop means for limiting upward movement of the float.

8. A photographic processing according to claim 4, wherein the means for allowing liquid to be drained comprises a drain conduit supported by the closure member, the guide member being positioned within the spout adjacent the drain conduit.

9. A photographic processing according to claim 8, wherein there are a plurality of guide members arranged around an entrance to the drain conduit, the float is annular and extends around the plurality of guide members, and the guide members include radial stop means for limiting upward movement of the float.

10. A photographic processing according to claim 8, wherein the spout and guide member are translucent to and the float is opaque to the beam of radiation.

11. A photographic processing according to claim 8, wherein the spout is translucent to and the float is reflective of the beam of radiation.

12. A photographic processing according to claim 4, wherein the means for allowing liquid to be drained comprises a frangible portion of the closure member, the guide member being positioned within the spout adjacent the frangible portion.

13. A photographic processing according to claim 12, wherein there are a plurality of guide members arranged around the frangible portion, the float is annular and extends around the plurality of guide members, and the guide members include radial stop means for limiting upward movement of the float.

14. A photographic processing according to claim 12, wherein the spout and guide members are translucent to and the float is opaque to the beam of radiation.

15. A photographic processing according to claim 12, wherein the spout is translucent to and the float is reflective of the beam of radiation.

16. A photographic processing according to claim 4, wherein the means for allowing liquid to be drained comprises a pierceable septum portion of the closure member, the guide member being positioned within the spout adjacent the septum portion.

17. A photographic processing according to claim 16, wherein there are a plurality of guide members arranged around the septum portion, the float is annular and extends around the plurality of guide members, and the guide members include radial stop means for limiting upward movement of the float.

18. A photographic processing according to claim 16, wherein the spout and guide members are translucent to and the float is opaque to the beam of radiation.

19. A photographic processing according to claim 16, wherein the spout is translucent to and the float is reflective of the beam of radiation.

20. A photographic processing according to claim 1, wherein the spout is translucent to and the float is reflective of the beam of radiation.

21. Apparatus for detecting low liquid level in a bottom-draining container, comprising:

- a spout extended outwardly from the container, the spout having a central bore through which liquid can drain from a bottom of the container;
- at least one guide member positioned in the spout;
- at least one float mounted for movement in the spout along the guide member, the float being buoyant in a liquid to be drained from the container and having a lower position in which an upper end of the float is within the spout;
- means for directing a beam of radiation into the spout along a path intersected by the float when a liquid drains to a preselected level within the spout;
- means for detecting when the float intersects the beams;
- a closure member for the spout, the guide member being supported by the closure member; and
- means supported by the closure member for allowing liquid to be drained from the container, wherein the means for allowing liquid to be drained comprises a valve supported by the closure member, the valve including a body member constituting the guide member.

* * * * *